United States Patent
Wang et al.

(10) Patent No.: US 7,263,229 B2
(45) Date of Patent: Aug. 28, 2007

(54) METHOD AND APPARATUS FOR DETECTING THE LOCATION AND LUMINANCE TRANSITION RANGE OF SLANT IMAGE EDGES

(75) Inventors: Xianglin Wang, Santa Ana, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 789 days.

(21) Appl. No.: 10/697,361

(22) Filed: Oct. 30, 2003

(65) Prior Publication Data

US 2005/0094877 A1  May 5, 2005

(51) Int. Cl.
*G06K 9/48* (2006.01)
*G06K 9/40* (2006.01)

(52) U.S. Cl. ...................... 382/199; 382/269

(58) Field of Classification Search ................ 382/181, 382/195, 199, 266, 269; 348/625, 627–629
See application file for complete search history.

(56) References Cited

U.S. PATENT DOCUMENTS

| | | | |
|---|---|---|---|
| 4,853,970 A * | 8/1989 | Ott et al. | 382/266 |
| 6,304,269 B1 * | 10/2001 | Ito | 345/589 |
| 6,477,282 B1 * | 11/2002 | Ohtsuki et al. | 382/266 |
| 6,982,723 B1 * | 1/2006 | Szymaniak | 345/611 |
| 2004/0189874 A1 | 9/2004 | Wang et al. | 348/627 |

\* cited by examiner

*Primary Examiner*—Colin LaRose
(74) *Attorney, Agent, or Firm*—Kenneth L. Sherman, Esq.; Michael Zarrabian, Esq.; Myers Dawes Andras & Sherman, LLP

(57) ABSTRACT

A system that detects the location as well as the luminance transition range of slant image edge in a digital image. The variance value of the pixels inside a rectangular image window centered with a current pixel is checked to determine if the current pixel is in an edge region or a in non-edge region. If the current pixel is in a non-edge region, no further checking is performed. Otherwise, it is determined if the current pixel is a center pixel in a luminance transition range of a slant edge. The values of the current pixel and its neighboring pixels inside the rectangular window are used to determine if the selected pixel is the center pixel in a luminance transition range of a slant edge. If it is, then the exact length of the luminance transition range of the slant edge is determined. Through such a detection process, both the center position and the luminance transition range of slant image edge can be determined.

23 Claims, 7 Drawing Sheets

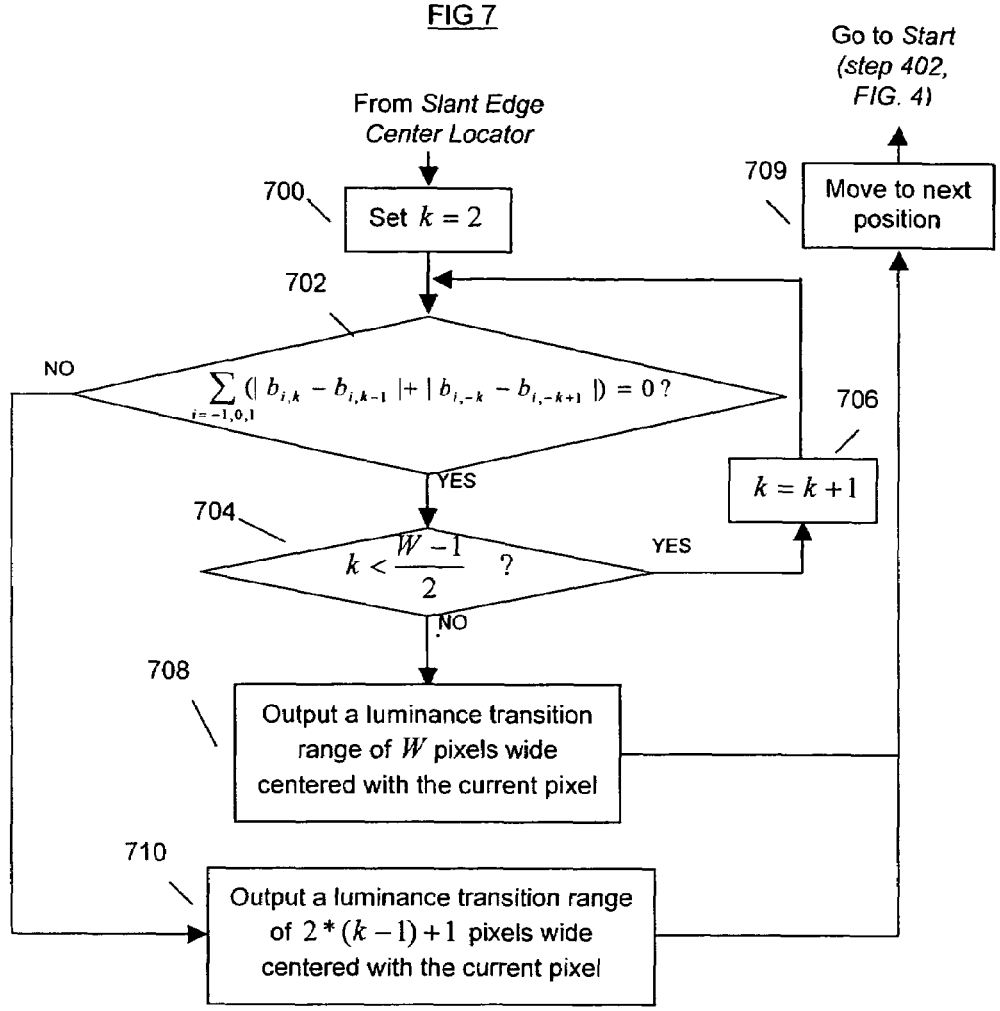

METHOD AND APPARATUS FOR DETECTING THE LOCATION AND LUMINANCE TRANSITION RANGE OF SLANT IMAGE EDGES

FIELD OF THE INVENTION

The present invention relates to image detail enhancement, and in particular, to detecting the location as well as the luminance transition range of slant image edges in digital images.

BACKGROUND OF THE INVENTION

In digital image systems (such as digital TV systems), in order to boost video quality, images are often enhanced in many different aspects, such as image details, image contrast, etc., before being displayed. For a digital image, the quality of edges in the image (i.e., image edges) are of great importance to the overall image quality. Therefore, during the enhancement processes, each image edge should be well preserved. In other words, image enhancement should not sacrifice image edge quality. Otherwise, the overall visual quality of the image may be degraded even though the image is enhanced in certain aspects.

An instance of such visual quality degradation is a zigzagged edge artifact due to conventional image detail enhancement. As the goal of image detail enhancement is to improve the image sharpness, high frequency image components that contain image details are extracted, enhanced and then added back to the original image. As a result, image details in the processed image become more obvious than those in the original image. However, some artifacts can also be introduced into image edges because of the enhancement.

An example of the zigzagged edge artifact is described in conjunction with FIGS. 1A-B. FIG. 1A shows an original image edge 10, wherein each small square block 11 in the edge 10 represents one image pixel. The edge direction has a low angle relative to the horizontal direction. Along the horizontal direction across the edge, there is a long luminance transition range 12 from dark area to bright area or vice versa, as indicated in FIG. 1A. The luminance transition range 12 refers to the length of the luminance transitioning area of an edge either along the horizontal direction or along the vertical direction across the edge. The boundary of the edge shown in FIG. 1A looks generally smooth even though the edge has a limited image resolution.

A conventional image detail enhancement process is applied to the image edge 10 of FIG. 1A to generate the enhanced image 14 in FIG. 1B. Because in an image detail enhancement process high frequency components are boosted, the luminance transition range 12 may become shorter (or sharper). As can be seen in FIG. 1B, the luminance transition range 12 along the horizontal direction has become much shorter relative to that in FIG. 1A. As a consequence, the edge boundary now includes zigzagged edge artifacts. The more the image is enhanced in the detail enhancement process, the more obvious this kind of artifact would be. As a result, even though the image in FIG. 1B is enhanced, the quality of the image looks poor due to the degradation of edge quality.

The problem shown in FIG. 1B exists for most slant image edges. A slant image edge refers to an image edge whose direction is not exactly vertical or horizontal. Only when an image edge has exactly vertical or horizontal or precisely ±45°(i.e. +45° or −45°) direction, it is immune to the problem shown in FIG. 1B. Otherwise, a slant image edge can develop zigzagged edge artifacts if it is enhanced substantially. The closer the slant image-edge direction is to horizontal or vertical direction, the easier it is for a slant image edge to develop zigzagged edge artifact when enhanced substantially and the more obvious the artifact would be.

Therefore, there is a need for a method of detecting the location and the luminance transition range of slant image edges so that pixels belonging to a slant edge can be processed separately or differently from the other image areas to avoid possible edge artifacts.

BRIEF SUMMARY OF THE INVENTION

The present invention addresses the above needs. In one embodiment, the present invention provides a method that can be used for detecting the location and luminance transition range of slant image edges in a digital image so that pixels belonging to each slant edge can be processed separately. In one example, the detection method is conducted on a pixel basis, wherein each pixel is checked together with its neighboring pixels inside a rectangular window centered with the current pixel.

Such a detection method includes three main processes, implemented as an Edge Region Detector, a Slant Edge Center Locator and a Luminance Transition Range Detector. In the Edge Region Detector, the variance value for the pixels inside said square/rectangular window is calculated. Based on the variance value, a current pixel can be classified as being in an edge region or in a non-edge region. If the current pixel is in a non-edge region, no further checking is needed. However, if the current pixel is in an edge region, then the Slant Edge Center Locator checks if the current pixel is a center pixel in a luminance transition range of a slant edge.

In the Slant Edge Center Locator, the values of the current pixel and its neighboring pixels inside said rectangular window are used to determine if the selected pixel is the center pixel in a luminance transition range of a slant edge. More specifically, the value of each pixel inside the window is compared with the luminance mean value of all the pixels inside the window, and only the comparison results are used in the succeeding detection process. To facilitate the processing, such comparison results can be saved as binary pattern data for each pixel in the window through a binary pattern data generator in the Slant Edge Center Locator. The binary pattern data essentially serve as a buffer for saving some intermediate results, and is therefore optional. However, using the binary pattern data helps reduce the complexity and improves the speed of the detection process at the expense of a little more memory.

The binary pattern data for the current pixel and its e.g. eight immediate neighboring pixels are then used to determine whether the current pixel is a center pixel in a luminance transition range of a slant edge. If it is, then the Luminance Transition Range Detector detects the exact length of the luminance transition range of the slant edge by checking more binary pattern data inside the rectangular window.

Through such a detection process, both the center position and the luminance transition range of slant image edge can be determined. These and other features, aspects and advantages of the present invention will become understood with reference to the following description, appended claims and accompanying drawings.

BRIEF DESCRIPTION OF THE DRAWINGS

FIG. 7 shows an example flowchart of the steps for processing in an embodiment of the Luminance Transition Range Detector of FIG. 2.

DETAILED DESCRIPTION OF THE INVENTION

The present invention addresses the above needs. In one embodiment, the present invention provides a method for detecting the location and luminance transition range of slant image edges in a digital image, so that pixels belonging to each slant edge can be processed separately/differently than other image pixels.

As noted, in one implementation, the detection method is conducted on a pixel basis, wherein each pixel is checked together with its neighboring pixels inside a rectangular window centered with the current pixel. The variance value of the pixels inside the rectangular window centered with a current pixel is checked to determine if the current pixel is in an edge region or in a non-edge region. If the current pixel is in an edge region, then the value of each pixel inside the rectangular window is compared with the mean value of the all the pixels inside the window. Only the comparison results are used in the succeeding detection process. To facilitate the processing, such comparison result at each pixel location can be saved as binary data corresponding to that pixel. Then using the binary data of the current pixel and its neighboring pixels, it is determined if the current pixel is a center pixel in a luminance transition range of a slant edge. If it is, then the exact luminance transition range is detected based on the binary data (binary pattern data), as described below in more detail.

Figure 1A:
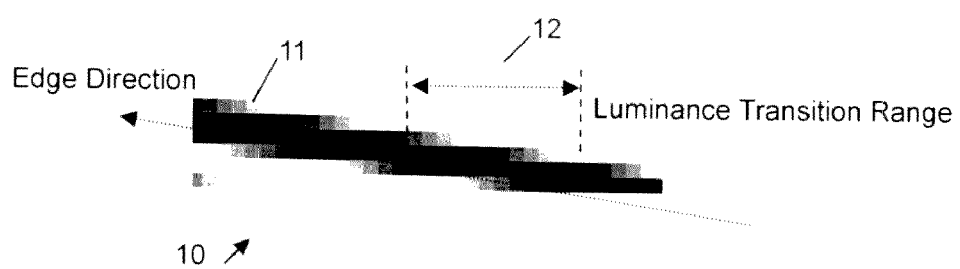
FIG. 1A shows an example smooth-looking image edge before detail enhancement.
Figure 1B:
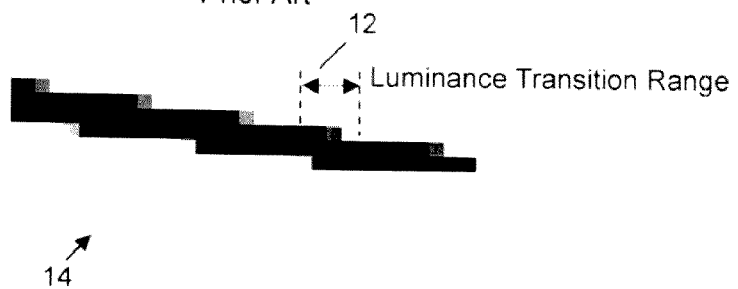
FIG. 1B shows the same edge in FIG. 1A after detail enhancement, wherein the edge becomes zigzagged due to enhancement.
Figure 2:
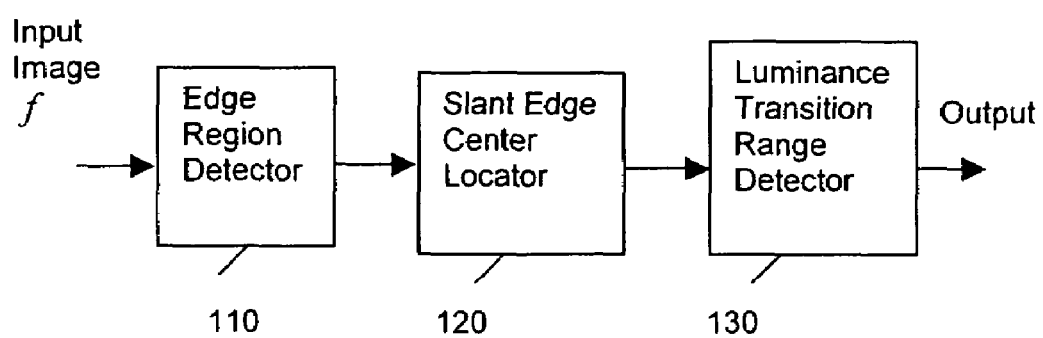
FIG. 2 shows an example block diagram of an embodiment of a detection system for detecting the center position and the luminance transition range of slant image edge, according to the present invention.

Referring to the example block diagram in FIG. 2, a detection system 100 implementing the above method of the present invention includes three functional processing blocks, identified in FIG. 2 as an Edge Region Detector 110, a Slant Edge Center Locator 120 and a Luminance Transition Range Detector 130. In the Edge Region Detector 110, the variance value for the pixels inside said rectangular window is calculated. Based on the variance value, a current pixel can be classified as being in an edge region or in a non-edge region. If the current pixel is in a non-edge region, no further checking is needed and a next pixel is processed. However, if the current pixel is in an edge region, then in the Slant Edge Center Locator 120, it is determined if the current pixel is a center pixel in a luminance transition range of a slant edge.

In the example Slant Edge Center Locator 120 herein, the value of each pixel inside the rectangular window is compared with the mean value of the all the pixels inside the window. Only the comparison results are used in the succeeding detection process. Then using said binary pattern data, it is determined whether the current pixel is a center pixel in a luminance transition range of a slant edge. In one example, the binary pattern data at the current pixel location and its neighboring pixels' binary pattern data (e.g., eight immediate neighboring pixels' binary pattern data), is used to determine if the current pixel is the center pixel in a luminance transition range of a slant edge. If it is, then the Luminance Transition Range Detector 130 detects the length of the luminance transition range of the slant edge by checking more binary data inside the rectangular window.

Through such a detection process, both the center position and the luminance transition range of slant image edge can be determined. The input to the detection system 100 in FIG. 2 is a digital image f, and output of the detection system 100 provides the center position, as well as the luminance transition range, of slant image edges in the input image f.

The slant edge information output from the detection system 100 can be saved in e.g. a data structure and used by a corresponding application to provide special processing for slant edge pixels. For example, such slant edge information can be utilized in an image detail enhancement system, wherein depending on the relative position of a slant edge pixel in the luminance transition range, an appropriate level of suppression can be provided to the enhancement at that pixel location to prevent zigzagged edge artifact. Such slant edge information can also be used for other image processing applications wherein edge pixels need to be processed differently from non-edge pixels.

In the following, the functionality of each of the three processing blocks/modules 110, 120 and 130 in the detection system 100 of FIG. 2 is explained in more detail in relation to FIG. 3. At the outset, it is worth noting that preferably the processing according the detection system 100 is performed twice at every pixel location, one for checking image edges whose direction is close to the horizontal direction and another for checking image edges whose direction is close to the vertical direction. The following, description is based on the case wherein the edge direction is close to the horizontal direction. However, similar steps are applicable to image edges whose direction is close to the vertical direction, by exchanging the processing of the rows and columns in the rectangular window.

Figure 3:
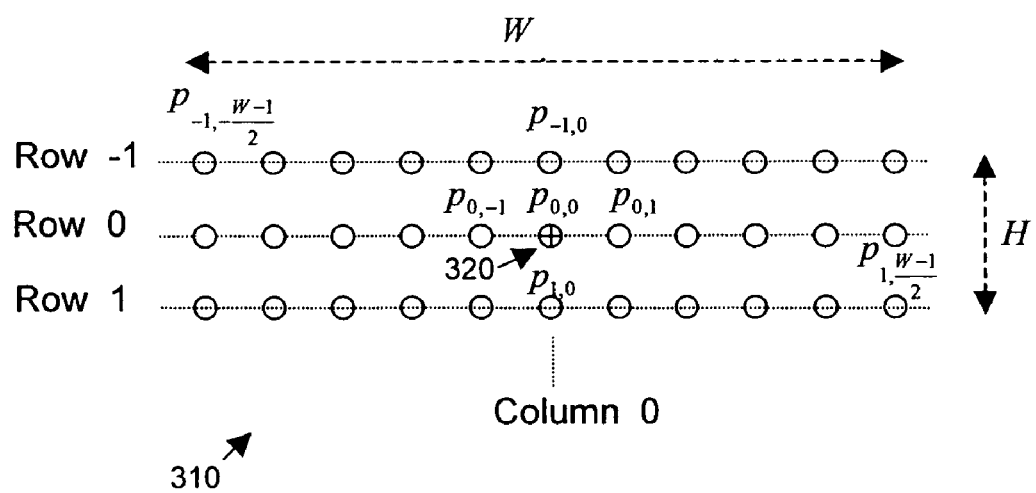
FIG. 3 shows a diagram of pixels inside an example window centered with a current/selected pixel and its neighboring pixels, for the detection of slant image edge at the current pixel location.

FIG. 3 shows an example diagram of a rectangular window 300 including pixels 310 (i.e., p), wherein the window 300 is defined inside the original image f. In this example, the window 300 is centered on a current/selected pixel 320. Only the pixels inside the rectangular window 300 are used for the detection of a slant image edge at the current pixel location. The rectangular window 300 has a dimension of W pixels along the horizontal direction and H pixels along the vertical direction, such that L is the total number of pixels 310 inside the rectangular window 300 (i.e., L=W*H). In this example, both H and W are odd numbers. Indices i and j represent the row and column index for the corresponding pixel, wherein $P_{i,j}$ denotes each pixel 310 inside the window 300, $I_{i,j}$ denotes the luminance value of pixel $p_{i,j}$ and each value $b_{i,j}$ denotes the corresponding binary pattern data.

As shown in FIG. 3, detection according to the detection system 100 (FIG. 2) is based on neighboring pixels within the rectangular window centered with the current pixel 320, designated as $p_{0,0}$. The current pixel $p_{0,0}$ is represented as a circle with a cross therein. The hollow circles represent neighboring pixels/samples of the current pixel $p_{0,0}$. Though eight immediate neighboring pixels are used in this example, as those skilled in the art will recognize, other number of neighboring pixels and at different positions relative to the current pixel $p_{0,0}$ may also be used.

To detect a slant edge in the window 300 whose direction is close to the horizontal direction, H takes a value of 3 and W takes a value larger than 3. As noted above, symmetrically, to detect a slant edge whose direction is close to the vertical direction, W takes a value of 3 and H takes a value larger than 3.

Figure 4:
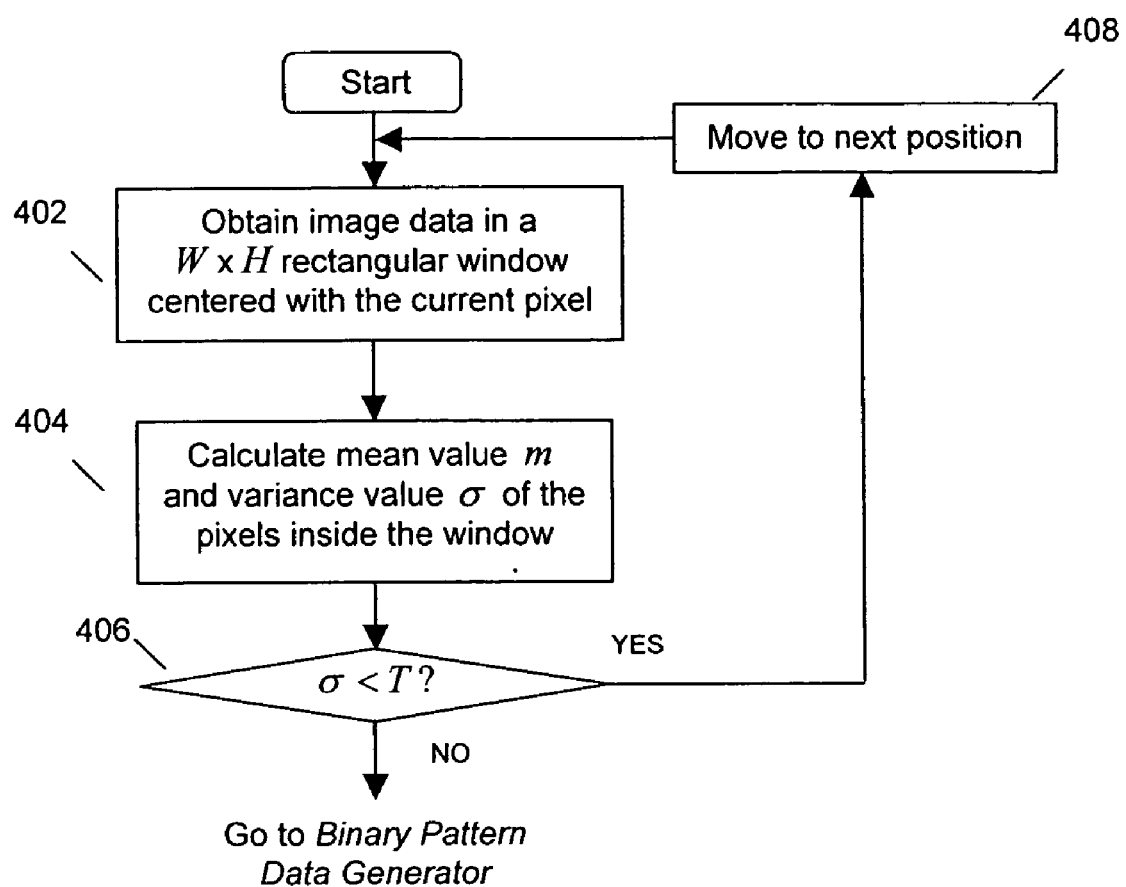
FIG. 4 shows an example flowchart of steps for processing in an embodiment of the Edge Region Detector of FIG. 2.

FIG. 4 shows example steps for determining if a current pixel belongs to an edge region. Referring to the example steps in FIG. 4 in conjunction with the diagram of FIG. 3, to determine if a current pixel belongs to an edge region, the window 300 of pixels 310 is selected (step 402). In this example H=3, indicating that 3 rows of image pixels are utilized, and W has a larger value than 3 because it determines the maximum length of the luminance transition range that can be checked along horizontal direction. As such, in FIG. 3, W=11. The selected values for W and H are examples only, and other values can also be selected as those skilled in the art will appreciate.

As described, each pixel inside the window 300 is denoted as $p_{i,j}$. After selection of the window 300, the Edge Region Detector 110 in the detection system of FIG. 2, first checks whether the current pixel $p_{0,0}$ is in an edge region. To do so, a variance value a is calculated based on a plurality of pixels around the current pixel $p_{0,0}$ in the rectangular window (step 404). The following is an example relation for calculating the variance value σ, wherein:

$$\sigma = \frac{1}{L} \sum_{i=-1,0,1} \sum_{j=-\frac{W-1}{2}}^{\frac{W-1}{2}} |I_{i,j} - m| \quad (1)$$

wherein, $I_{i,j}$ denotes the luminance value of pixel $p_{i,j}$, m is the mean value of said plurality of pixels inside the rectangular window 300 and is defined according to the following example relation:

$$m = \frac{1}{L} \sum_{i=-1,0,1} \sum_{j=-\frac{W-1}{2}}^{\frac{W-1}{2}} I_{i,j} \quad (2)$$

The variance value σ is then checked against a predetermined threshold T, wherein T≧0 (step 406). If σ is smaller than T, then the current pixel $p_{0,0}$ is considered to be in a non-edge region. In that case, no further checking is needed at the current pixel $p_{0,0}$ location and the process moves to the next pixel (step 408).

However, if the variance value σ is not less than the threshold T, the current pixel $p_{0,0}$ is considered as being in an edge region and the Slant Edge Center Locator 120 (FIG.

Figure 5A:
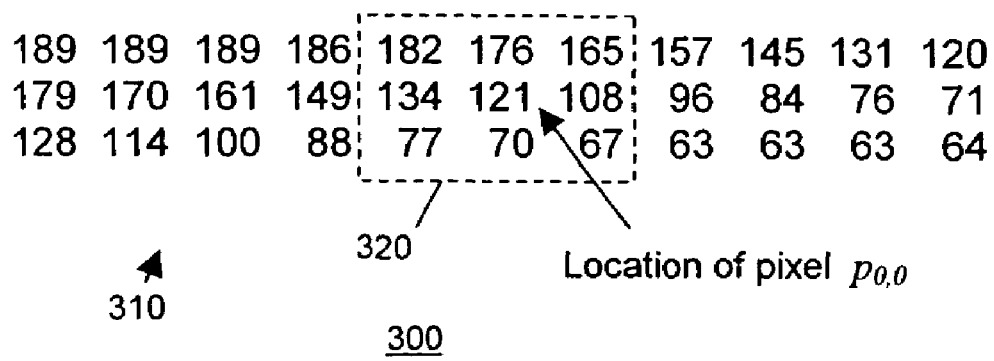
FIG. 5A shows an example of image pixel data inside the window centered with a current pixel.

2) determines if the current pixel is a center pixel in a luminance transition range of a slant edge. In the Slant Edge Center Locator 120, the value of each pixel inside the rectangular window 300 is compared with the mean value of all the pixels inside the window 300. Only the comparison results are used in the succeeding detection process. As noted, to facilitate the processing, such comparison result at each pixel location can be saved as binary data corresponding to that pixel, as shown by the example diagrams in FIGS. 5A-B, through a binary pattern data generator in the Slant Edge Center Locator 120. FIG. 5A shows an example of image pixel data inside the window 300 centered with the current pixel $p_{0,0}$, and FIG. 5B shows an example corresponding binary data 500 generated from the pixel data shown in FIG. 5A.

Figure 5B:
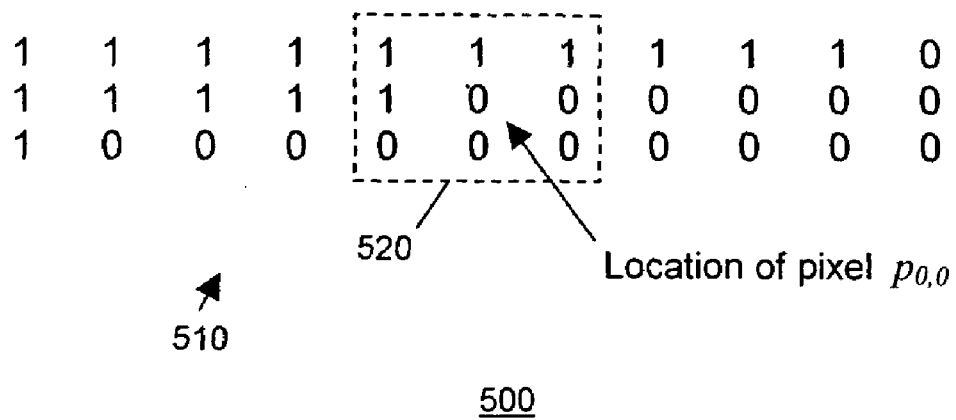
FIG. 5B shows an example corresponding binary data generated from the pixel data shown in FIG. 5A.
Figure 6:
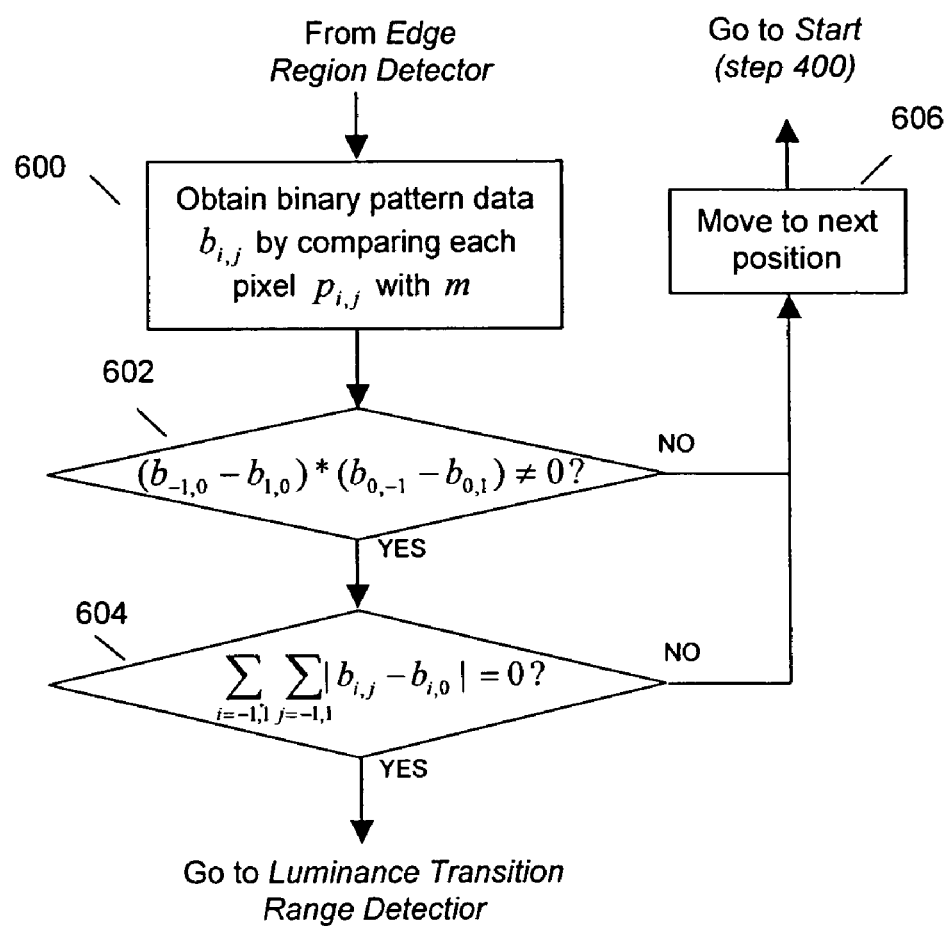
FIG. 6 shows an example flowchart of the steps for processing in an embodiment of the Slant Edge Center Locator of FIG. 2.

In the description herein, the windows in FIGS. 3 and 5A-5B, are of the same dimensions and the values therein are indexed in rows and columns in the same manner as described in relation to FIG. 3. Now also referring to the example steps of FIG. 6, in the Slant Edge Center Locator 120 the luminance value $I_{i,j}$ of each pixel inside the rectangular window 300 is compared with the mean value m (step 600), whereby the corresponding binary data $b_{i,j}$ can be generated according to the example relation:

$$b_{i,j} = \begin{cases} 0 & \text{if } I_{i,j} < m \\ 1 & \text{if } I_{i,j} \geq m \end{cases} \quad (3)$$

In the example shown in FIG. 5A, pixel luminance is in a range of [0, 255]. A value of $I_{i,j}$=255 represents the brightest luminance level and a value of $I_{i,j}$=0 represents the darkest luminance level. Using the above relations, the mean value m is calculated to be 123 for the pixel values in FIG. 5A, wherein the diagram in FIG. 5B shows that pattern 500 of binary data 510 generated from the pixel data shown in FIG. 5A according to relation (3).

Such binary data 500 essentially serve as a buffer for saving some intermediate results in the process and is therefore optional. However, using the binary data helps reduce the complexity and improve the speed of the detection process at the expense of a little more memory. To simplify the description of the present invention, the binary data 500 are used in the following. However, as noted, the binary data 500 need not necessarily be generated in the process because the relationship between the value of each pixel in the rectangular window 300 and the luminance mean value of all the pixels inside the window 300 can also be obtained on the fly.

Referring back to the Slant Edge Center Locator 120 of FIG. 2, the binary data values in the pattern 500 at the location of pixel $p_{0,0}$ and its eight immediate neighboring binary data values are checked to determine whether the current pixel $p_{0,0}$ is the center pixel in a luminance transition range of a slant image edge. The binary value corresponding to the location of the current pixel $p_{0,0}$ is $b_{0,0}$, and the binary values corresponding to the eight neighboring pixels of the current pixel $p_{0,0}$, are $b_{i,j}$, i, j=−1, 0, 1, excluding $b_{0,0}$ itself. As such, the closest four neighboring binary pattern data, $b_{-1,0}$, $b_{1,0}$, $b_{0,-1}$ and $b_{0,1}$, are checked first (step 602). If $b_{-1,0}$ and $b_{1,0}$ have different values, and $b_{0,-1}$ and $b_{0,1}$ also have different values, then the current pixel $p_{0,0}$ is considered as a candidate for being the center pixel in a luminance transition range of a slant edge. These conditions can be expressed according to the example relation:

$$(b_{-1,0} - b_{1,0}) * (b_{0,-1} - b_{0,1}) \neq 0 \quad (4)$$

If condition (4) is not satisfied (i.e., it is false), then the current pixel $p_{0,0}$ is not a center pixel in the luminance transition range of a slant image edge, and no further checking is needed at the current pixel location, so that the process moves to the next position (step 606). Otherwise, if condition (4) is satisfied (i.e., true), then the other four binary pattern data, $b_{-1,-1}$, $b_{-1,1}$, $b_{1,-1}$ and $b_{1,1}$, are checked (step 604). If $b_{-1,-1}$ and $b_{-1,1}$ both have the same value as $b_{-1,0}$, and also $b_{1,-1}$ and $b_{1,1}$ both have the same value as $b_{1,0}$, then the current pixel $p_{0,0}$ is considered as a center pixel in a luminance transition range of a slant edge. In addition, it can be assumed that the luminance transition range centered with the current pixel is at least 3 pixels wide. These above conditions can be expressed according to the example relation:

$$\sum_{i=-1,1} \sum_{j=-1,1} |b_{i,j} - b_{i,0}| = 0 \qquad (5)$$

If condition (5) is not satisfied (i.e., it is false), then the current pixel $p_{0,0}$ is not a center pixel in the luminance transition range of a slant image edge, and no further checking is needed at the current pixel location, so that the process moves to the next position (step 606).

Otherwise, if condition (5) is satisfied (i.e., true), then as shown by the example steps in FIG. 7, the Luminance Transition Range Detector 130 in FIG. 2 detects the length of the luminance transition range with more binary pattern data involved in the checking process. In the Luminance Transition Range Detector 130, the detection of the luminance transition range starts from columns 2 and −2 around the current pixel $p_{0,0}$ in the binary pattern 500 such as in FIG. 5B, and goes left and right simultaneously (step 700). Each time two more columns of the binary pattern data are included, one from the left side and one from the right side of the current pixel.

For example, initially the binary values $b_{-1,-2}$, $b_{0,-2}$ and $b_{1,-2}$ from column −2, and the binary values $b_{-1,2}$, $b_{0,2}$ and $b_{1,2}$ from column 2 are included in the process. If $b_{-1,-2}$, $b_{0,-2}$ and $b_{1,-2}$ each has the same value as $b_{-1,-1}$, $b_{0,-1}$ and $b_{1,-1}$, respectively, and $b_{-1,2}$, $b_{0,2}$ and $b_{1,2}$ each has the same value as $b_{-1,1}$, $b_{0,1}$ and $b_{1,1}$, respectively, then the pixel corresponding to $b_{0,-2}$ and the pixel corresponding to $b_{0,2}$ can also be considered as being in the luminance transition range of the edge, so that it can be assumed that the luminance transition range is at least 5 pixels wide.

Using the same method, column −3 and column 3 of the binary pattern data can also be checked. If data in column −3 are the same at those in column −2, and meanwhile data in column 3 are the same at those in column 2, then it can be assumed that the luminance transition range is at least 7 pixels wide.

As such, in general, after column k−1 and column −(k−1) are checked, wherein the luminance transition range is assumed to be at least 2*(k−1)+1 pixels wide, then column k and column −k can be checked, where $$2 \le k \le \frac{W-1}{2}.$$

For example, to check the binary pattern data in column k and column −k (step 702), the following example condition according to the above description, is utilized:

$$\sum_{i=-1,0,1} (|b_{i,k} - b_{i,k-1}| + |b_{i,-k} - b_{i,-k+1}|) = 0 \qquad (6)$$

If condition (6) is satisfied (i.e., true), then column k and column −k have the same data as that in column k−1 and column −(k−1), respectively, and it can be assumed that the luminance transition range is at least 2*k+1 pixels wide. Then, so long as there is another column to consider (step 704), the process is extended to the additional columns as noted above (step 706).

Therefore, such a checking process can continue until either condition (6) is not true, wherein the process proceeds to step 710, or until all the binary pattern data in the rectangular window have been checked according to steps 702, 704 and 706. For example, assuming that the checking process has reached column k and column −k, if condition (6) is false, then the detection process stops for the current pixel $p_{0,0}$ location and the luminance transition range is considered as 2*(k−1)+1 pixels wide (step 710). However, if condition (6) is true but k equals to $$\frac{W-1}{2}$$

(step 704), indicating that all the binary data inside the rectangular window have been checked, the detection process stops for the current pixel $p_{0,0}$ location and the luminance transition range is considered as (2*k+1)=W pixels wide (step 708).

In the above process, detecting the luminance transition range for a slant edge is conducted according to the condition in relation (6), wherein the detection starts with k=2 (step 700). Each time the binary pattern data in column k and column −k are compared with that in column k−1 and column −(k−1), respectively. If they are the same, and $$k < \frac{W-1}{2}$$

(step 704), then k is increased by 1 (step 706) and the same checking process continues. If they are the same, and $$k = \frac{W-1}{2},$$

then the checking terminates for the current pixel $p_{0,0}$ location and the luminance transition range is considered as W pixels wide centered with the current pixel $p_{0,0}$ (step 708).

If the binary pattern data in column k and column −k are not the same as that in column k−1 and column −(k−1), respectively, then the checking process terminates for the current pixel $p_{0,0}$ location and the luminance transition range is considered as 2*(k−1)+1 pixels wide, centered with the current pixel (710).

As such, the example detection system 100 (FIG. 2) and method according to the present invention, described herein, determine both the center position and the luminance transition range of slant image edge. This allows separate or different processing of the detected pixels from other image areas. For example, when such detection results are used in an image detail enhancement process, the quality of image edges, especially slant edges, can be preserved while the other image areas can still be effectively enhanced. Such a detection method is useful not only in image detail enhancement, but also it can be useful in image processing techniques wherein image edges must be processed separately or differently from the other image areas.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned detection system according to the present invention, can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of detecting the location and luminance transition range of a slant image edge in a digital image comprising pixels, the method comprising the steps of:
    (a) defining a two-dimensional window of pixels in the digital image;
    (b) determining a variance value for a plurality of pixels around a selected pixel inside said window;
    (c) based on the variance value, determining if the selected pixel is in an edge region;
    (d) if the selected pixel is in an edge region, then determining if the selected pixel is essentially a center pixel in a luminance transition range of a slant edge; and
    (e) if the selected pixel is essentially a center pixel in a luminance transition range of the slant edge, then determining the length of the luminance transition range of the slant image edge.

2. The method of claim 1, wherein:
in step (a) the window comprises a W×H window including L=W×H pixels, wherein the window is centered around the selected pixel; and
in step (b) determining a variance value σ for said plurality of pixels is according to the relation:

$$\sigma = \frac{1}{L} \sum_{i=-1,0,1} \sum_{j=-\frac{W-1}{2}}^{\frac{W-1}{2}} |I_{i,j} - m|$$

wherein i, j are row and column indices for the window,
$I_{i,j}$ represents the luminance value of a window pixel $p_{i,j}$ at row i and column j, such that selected pixel is at row 0, column 0, and
m represents the mean value of said plurality of pixels.

3. The method of claim 2, wherein:

$$m = \frac{1}{L} \sum_{i=-1,0,1} \sum_{j=-\frac{W-1}{2}}^{\frac{W-1}{2}} I_{i,j}.$$

4. The method of claim 1, wherein in step (c) determining if the selected pixel is in an edge region, further comprises the steps of:
    comparing said variance value to a threshold T; and
    if the variance value is not smaller than T, then the selected pixel is in an edge region.

5. The method of claim 1, wherein in step (d) the values of the selected pixel and its neighboring pixels are used to determine if the selected pixel is the center pixel in a luminance transition range of a slant edge.

6. The method of claim 5, wherein step (d) further includes the steps of determining the mean value of said plurality of pixels in the window and comparing the luminance value of each pixel to the mean value.

7. The method of claim 6, wherein step (d) further includes the steps of saving the comparison results as binary data for each pixel in the window, wherein if the pixel luminance value is less than the mean value then a binary value x is selected for that pixel, otherwise, another binary value y is selected for that pixel, wherein the binary values form said binary pattern.

8. The method of claim 7, wherein:
a binary data $b_{i,j}$ is defined according to the relation:

$$b_{i,j} = \begin{cases} x & \text{if } I_{i,j} < m \\ y & \text{if } I_{i,j} \geq m \end{cases}$$

wherein i, j are row and column indices for the window,
$I_{i,j}$ represents luminance value of a window pixel $p_{i,j}$ at row i and column j, such that selected pixel is at row 0, column 0, and
m represents the mean value of at least said plurality of pixels; and
the step of determining if the selected pixel is the center pixel in a luminance transition range of a slant edge, comprises the steps of determining if:

$$(b_{-1,0} - b_{1,0}) * (b_{0,-1} - b_{0,1}) \neq 0,$$

$$\sum_{i=-1,1} \sum_{j=-1,1} |b_{i,j} - b_{i,0}| = 0,$$

such that if both conditions are true, then the selected pixel is a center pixel in the luminance transition range of a slant image edge.

9. The method of claim 7, wherein in step (e) determining the length of the luminance transition range of a slant edge further comprises the steps of:
    for a column k in the binary pattern, wherein $$2 \leq k \leq \frac{W-1}{2},$$

initially selecting k=2, and in a loop indexed around k, performing the steps of:

comparing the binary values in column k and column −k of the binary pattern with those in column k−1 and column −(k−1) of the binary pattern, respectively, if the compared values are the same and $$k < \frac{W-1}{2},$$

then k is increased by 1 and the comparison is repeated, otherwise if the compared values are the same and $$k = \frac{W-1}{2},$$

then the loop terminates for the selected pixel, and the luminance transition range is selected as W pixels wide centered around the selected pixel, and if the compared values are not the same, then the loop terminates for the selected pixel, and the luminance transition range is selected as 2*(k−1)+1 pixels wide centered around the selected pixel.

10. The method of claim 9, wherein the steps of comparing the binary values in column k and column −k of the binary pattern with those in column k−1 and column −(k−1) of the binary pattern, respectively, comprises the steps of determining if the following condition:

$$\sum_{i=-1,0,1} (|b_{i,k} - b_{i,k-1}| + |b_{i,-k} - b_{i,-k+1}|) = 0,$$

is true for the selected pixel and its neighboring pixels, such that if the condition is true, then said compared values are the same.

11. A detection system that detects the location and luminance transition range of a slant image edge in a digital image including pixels, comprising:

an edge region detector that determines if a selected pixel in a two-dimensional window of pixels in the digital image, is in an edge region; and a slant edge center locator configured such that if the selected pixel is in an edge region, the slant edge center locator determines if the selected pixel is essentially a center pixel in a luminance transition range of a slant edge, and if the selected pixel is essentially a center pixel in a luminance transition range of a slant edge, the slant edge center locator determines the length of the luminance transition range of the slant image edge.

12. The detection system of claim 11, wherein the edge region detector further determines a variance value for a plurality of pixels around the selected pixel inside said window, and based on the variance value, determines if the selected pixel is in an edge region.

13. The detection system of claim 12, wherein:

the window comprises a W×H window including L=W×H pixels, wherein the window is centered around the selected pixel; and the edge region detector determines a variance value σ for said plurality of pixels according to the relation:

$$\sigma = \frac{1}{L} \sum_{i=-1,0,1} \sum_{j=-\frac{W-1}{2}}^{\frac{W-1}{2}} |I_{i,j} - m|$$

wherein i, j are row and column indices for the window, $I_{i,j}$ represents the luminance value of a window pixel $p_{i,j}$ at row i and column j, such that selected pixel is at row 0, column 0, and m represents the mean value of said plurality of pixels.

14. The detection system of claim 13, wherein:

$$m = \frac{1}{L} \sum_{i=-1,0,1} \sum_{j=-\frac{W-1}{2}}^{\frac{W-1}{2}} I_{i,j}.$$

15. The detection system of claim 12, wherein the edge region detector further determines if the selected pixel is in an edge region, by comparing said variance value to a threshold T, such that if the variance value is not smaller than T, then the selected pixel is in an edge region.

16. The detection system of claim 11, wherein the slant edge center locator further uses the values of the selected pixel and its neighboring pixels to determine if the selected pixel is the center pixel in a luminance transition range of a slant edge.

17. A detection system that detects the location and luminance transition range of a slant image edge in a digital image including pixels, comprising:

an edge region detector that determines if a selected pixel in a two-dimensional window of pixels in the digital image, is in an edge region; and a slant edge center locator including a binary pattern data generator, wherein if the selected pixel is in an edge region, then the binary pattern data generator generates a binary pattern for the pixels in the window based on the mean value of said plurality of pixels in the window, the binary pattern comprising binary values corresponding to the pixel values, such that the slant edge center locator uses the binary pattern to determine if the selected pixel is a center pixel in a luminance transition range of a slant edge, and if so, then determines the length of the luminance transition range around the selected pixel location.

18. The detection system of claim 17, wherein the edge region detector further determines a variance value for a plurality of pixels around the selected pixel inside said window, and based on the variance value, determines if the selected pixel is in an edge region.

19. The detection system of claim 18, wherein:

the window comprises a W×H window including L=W×H pixels, wherein the window is centered around the selected pixel;

the edge region detector determines a variance value σ for said plurality of pixels according to the relation:

$$\sigma = \frac{1}{L} \sum_{i=-1,0,1} \sum_{j=-\frac{W-1}{2}}^{\frac{W-1}{2}} |I_{i,j} - m|$$

wherein i, j are row and column indices for the window, $I_{i,j}$ represents value of a window pixel $p_{i,j}$ at row i and column j, such that selected pixel is at row 0, column 0, and m represents the mean value of at least said plurality of pixels.

20. The detection system of claim 19, wherein:

$$m = \frac{1}{L} \sum_{i=-1,0,1} \sum_{j=-\frac{W-1}{2}}^{\frac{W-1}{2}} I_{i,j}.$$

21. The detection system of claim 18, wherein the edge region detector further determines if the selected pixel is in an edge region, by comparing said variance value to a threshold T, such that if the variance value is not smaller than T, then the selected pixel is in an edge region.

22. The detection system of claim 17, wherein the binary pattern data generator further determines the mean value of said plurality of pixels in the window, and compares the luminance value of each pixel to the mean value, wherein if the pixel luminance value is less than the mean value then a binary value of x is selected for that pixel, otherwise, a binary value of y is selected for that pixel, wherein the binary values form said binary pattern.

23. The detection system of claim 22, wherein:

the window is a W×H window including L=W×H pixels, wherein the window is centered around the selected pixel;

the binary values, $b_{i,j}$, are defined according to the relation:

$$b_{i,j} = \begin{cases} x & \text{if } I_{i,j} < m \\ y & \text{if } I_{i,j} \geq m \end{cases}$$

wherein i, j are row and column indices for the window, $I_{i,j}$ represents value of a window pixel $p_{i,j}$ at row i and column i, such that selected pixel is at row 0, column 0, and m represents the mean value of at least said plurality of pixels; and the slant edge center locator uses the binary values corresponding to the selected pixel and its neighboring pixels to determine if the selected pixel is the center pixel in a luminance transition range of a slant edge.

* * * * *